United States Patent Office

3,161,623
Patented Dec. 15, 1964

3,161,623
PROCESS FOR THE MANUFACTURE OF VINYL CHLORIDE POLYMERS AND COPOLYMERS HAVING IMPROVED PROCESSING PROPERTIES
Gerhard Kühne, Burghausen, Upper Bavaria, Germany, assignor to Farbwerke Hoechst Aktiengesellschaft vormals Meister Lucius & Brüning, Frankfurt am Main, Germany, a corporation of Germany
No Drawing. Filed July 14, 1960, Ser. No. 42,748
Claims priority, application Germany, July 18, 1959,
F 28,968/59
9 Claims. (Cl. 260—92.8)

The present invention relates to a process for the manufacture of vinyl chloride polymers and copolymers having improved processing properties.

It is known that a polyvinyl chloride obtained by suspension polymerization, the grains of which have a porous structure, can be mixed with a liquid plasticizer to form a dry, flowable mixture (dry-blend) and that in this manner the mixture need not be granulated prior to being processed in the extruder. Also when working up a polyvinyl chloride that does not contain a plasticizer, a porous grain structure may be of importance.

The methods that have up to now been applied to produce such a structure are conformable in that suitable substances are incorporated as auxiliary agents in the aqueous phase of the batch of the suspension polymerization. Thus it is proposed, for example, to add to the aqueous phase, in addition to methyl cellulose as a suspension agent, 0.02 to 0.15 part of an anionic emulsifier, such as sodium lauryl sulfate, and 0.02 to 0.15 part of a water-soluble polyvalent metal salt, for example barium chloride. There is, furthermore, described a system in which, as a suspension agent, there is used a copolymer of vinyl acetate and maleic anhydride in the ratio of 1:1 and, as an addition, an adduct of ethylene oxide and a partial fatty acid ester of a polyhydric alcohol; as a further addition having a synergistic effect there is used a monofatty acid ester of glycerol, ethylene glycol or diethylene glycol.

In the first process, the presence of electrolytes in the polymer is very harmful to the electrical properties of the polymer. In the second process, the carboxyl groups of the suspension agent likewise cause a deterioration in the electric properties; however, of even greater disadvantage is the tendency of such plasticizer-containing masses to stick to metal surfaces during the processing.

Now I have found that vinyl chloride polymers and copolymers possessing a porous grain structure can be prepared without incurring the aforesaid disadvantages by dissolving substances, which are readily soluble in chlorinated hydrocarbons and which have surface-active properties in an aqueous solution, prior to the polymerization in the monomer to give a clear or, at least, opalescent solution, stirring this solution into an aqueous solution of a known suspension agent and polymerizing the suspension obtained in known manner. If desired, the oil-soluble activator required for starting the polymerization, chosen from the usual series of peroxides or azonitriles (for example, benzoyl peroxide, lauryoyl peroxide or azoisobutyronitrile) can also be dissolved in the monomer.

The surface activity of the substances used according to the invention, which are to be dissolved in the monomer, may vary within wide limits. The surface tension of these substances, in the case of an aqueous solution of 0.05% strength and at a temperature of 25° C., is preferably situated within a range of 60 to 68 dynes/cm. For example, the oxalkylation products of organic compounds containing carboxyl groups, hydroxyl groups or amino groups fulfill these requirements. The oxalkylation products of partial esters of polyhydric aliphatic alcohols having 2 to 10, preferably 3 to 6 carbon atoms, and saturated or unsaturated fatty acids, especially those having 12 to 20 carbon atoms, belong to this group of compounds. It is often preferred to apply the oxalkylation products of polymeric compounds containing carboxylic acid groups or hydroxyl groups, especially the homo- or copolymers of unsaturated carboxylic acids, such as acrylic acid or methacrylic acid, copolymers of maleic acid or the partial esters thereof with aliphatic alcohols having 1 to 20 carbon atoms with vinyl monomers, polymers of vinyl alcohol alone or copolymers with carboxylic acid esters thereof having 1 to 20 carbon atoms, such as vinyl acetate or vinyl laurate, also copolymers with styrene, vinyl toluene etc., inasmuch as they possess the aforementioned prerequisites with respect to the presence of carboxyl or hydroxyl groups; also the polymeric lactone carboxylic acids or hydroxycarboxylic acids, the preparation of which is described, for example, in German printed patent applications 1,053,181 and 1,054,714.

By oxalkylation there is to be understood in this case both the reaction with alkylene oxides and the esterification with polyalkylene glycols. The alkylene groups of these oxalkylation agents may contain 2 to 10 carbon atoms, preferably no more than 5 carbon atoms or, in the case of polyalkylene glycols, many times these numbers.

The substances proposed are applied in a concentration ranging from 0.02 to 3.0%, preferably 0.2 to 0.8%, calculated on the monomer.

The further polymerization is effected in the manner known for the suspension polymerization of vinyl chloride described, for example, in "Polyvinylchlorid und Vinylchloridmischpolymerisate" by F. Kainer, edition Springer, Berlin, Göttingen, Heidelberg, 1951 (cf. especially pages 53 and 54). The polymerization proceeds within a temperature range of 40 to 65° C.; however, it can also be effected at lower temperatures with the aid of redox systems.

As plasticizers, there may be used those which are customarily applied to polyvinyl chloride (cf., for example, Kainer, page 145 et seq.). Certain additions, such as chain breaking agents or stabilizers, can be made in the usual manner.

Copolymerizations can be effected with the known unsaturated compounds, such as vinyl esters, vinylidene chloride, maleic acid esters, or esters of acrylic acid or methacrylic acid. The portion of vinyl chloride shall in this case amount to at least 20%.

The substances to be applied in order to attain an internal porosity of the polymer grain have, since they are soluble in the usual plasticizers, also the function to accelerate the gel tendency of the polymer. Since these substances cannot, in the gelling process, be regarded as alien substances in the polyvinyl chloride, as is the case with the usual suspension agents, they increase the surface gloss and the transparency of plasticized masses, such as shaped articles and sheets.

The process, furthermore, offers the advantage that the portion of the suspension agent incorporated in the polymer that is foreign to the material to be treated, such as methyl cellulose, gelatine or partially esterified polyvinyl alcohol, can be reduced substantially, thus obtaining products having improved processing properties.

The following examples serve to illustrate the invention but they are not intended to limit it thereto, the parts being by weight:

EXAMPLE 1

(a) *Reference batch 1.*—220 parts of water in which 0.15 part of methyl cellulose was dissolved were placed together with 0.2 part of lauroyl peroxide in a pressure vessel (capacity: 400 liters) equipped with an impeller and a flow breaker and, after eliminating the oxygen, 100 parts of vinyl chloride were introduced, with agitation. The contents of the vessel were brought to 53° C. and the temperature maintained. After 12 to 13 hours, the reaction was terminated, and the contents could be discharged after cooling. A fine polymer that could be centrifuged was obtained which, after drying, exhibited the properties listed in the table.

(b) *Reference batch II.*—Instead of 0.15 part, only 0.10 part of methyl cellulose together with 0.8 part of a copolymer of maleic acid butyl semi-ester and styrene in the molar ratio of 1:1, which copolymer was subsequently hydroxyethylated with 15 moles of ethylene oxide, was dissolved, in the same manner as indicated under 1(a), in 220 parts of water and placed in the vessel. The operation was continued as described under (a). There was likewise obtained a fine-grained polymer exhibiting the properties listed in the table.

(c) *Batch III (according to the invention).*—220 parts of water in which was dissolved 0.10 part of methyl cellulose were placed in the same vessel (capacity: 400 liters). Then a solution containing 0.8 part of the hydroxyethylated copolymer indicated in 1(b) in 100 parts of vinyl chloride was prepared in a separate pressure vessel, 0.2 part of lauroyl peroxide also being dissolved in the solution. Then this solution was stirred into the aqueous solution which had been placed in the vessel. The polymerization was again run at 53° C. for 12 to 13 hours. The polymer obtained was worked up as described above. The properties of the polymer are shown in the following table:

Table (Example I)

| Product | K value | Bulk density, g./l. | Grain size in μ | Dryblend behavior | | Period of sheet formation,[3] seconds | Sheet free from fisheyes, obtained after[4]— |
|---|---|---|---|---|---|---|---|
| | | | | Grease-spot test,[1] minutes | Centrifugal test,[2] 25° C., g. | | |
| Reference product I | 70.1 | 470 | <300 | 30 | 20.0 | 80 | Minutes 7 |
| Reference product II | 70.3 | 415 | <250 | 25 | 38.0 | 65 | 5 |
| Batch III | 70.7 | 375 | <250 | 0 | 49.5 | 55 | 3 |

[1] *Grease-spot test.*—The polyvinyl chloride, in the usual ratio of 70 parts polyvinyl chloride : 30 parts dioctyl phthalate was made into a paste by hand and was heated at 85° C. in a drying closet after being stored at room temperature for 30 minutes (0-test). After 5, 10, 15 minutes etc., respectively, samples were taken and pressed on a sheet of filter paper by means of a weight of 500 grams. As long as there appeared a "grease-spot," the plasticizer had not yet been completely absorbed by the polymer. Thus the valence 0 purports that the total quantity of plasticizer had been bound by adsorption already prior to the heat treatment and, therefore, was the optimum valence that could be attained.

[2] *Centrifugal test.*—Polyvinyl chloride was stirred into a paste with an excess quantity of plasticizer and the mass was allowed to stand at room temperature for 10 minutes. Then the plasticizer that had not been adsorbed was centrifuged at a rate of 5000 r.p.m. The amount of plasticizer adsorbed per 100 grams of polyvinyl chloride serves as a measure for the adsorptive power. The larger the quantity, the better the adsorptive power.

[3] *Duration of sheet formation.*—300 grams of a mixture of polyvinyl chloride with a plasticizer (70:30) stabilized in known manner were delivered at a temperature of 170° C. to a laboratory mixing roller (roller diameter: 130 mm.) in a manner such that no polyvinyl chloride fell through the roller gap. While continuously moving apart the pair of rollers in accordance with the tendency of sheet formation, the time was measured that was required for the formation of a continuous rough sheet of thorough gelation. The shorter the time, the better the gel tendency.

[4] *Measurement of the fish eyes.*—The sheet formed according to ([3]) was rotated on the roller. After 1.5, 3.0, 5.0, 7, 10, 15 and 20 minutes, test samples were taken having a thickness of 500μ (the test samples were examined visually with respect to their homogeneity). The time required until a rough sheet was obtained that was free from fish eyes likewise served as a measure for the processibility of the material.

As shown in the table, the product obtained from batch III (i.e. according to the invention) exhibited the optimum porous structure, as results from the bulk density which was by far lower than the bulk density of the comparative products (the grain size being approximately the same). The porosity of the material manifested itself in the appreciably increased absorptive capacity for the plasticizer, i.e. in a dry, flowable mixture (dry blend) which, again, resulted in an improved gel tendency and processibility.

EXAMPLE 2

According to Example 1(c), there is, instead of the hydroxyethylated copolymer, applied an esterification product of a copolymer of maleic acid cetyl semi-ester and acrylic acid butyl ester (1:1) with a polyethylene glycol having a molecular weight of 200 (molar ratio of copolymer to polyethylene glycol=1:3). The results obtained are analogous to those obtained in Example 1(c).

EXAMPLE 3

When working according to the conditions as described in Example 1(c), there is, instead of the hydroxyethylation product, applied an esterified copolymer obtained by copolymerizing acrylic acid with vinyl acetate in the ratio of 1:2 and by subsequent esterification with a polyethylene glycol having a molecular weight of 10,000 (molar ratio 1:1). The powder obtained had a porous grain structure.

EXAMPLE 4

The process was carried out as described in Examples 1(c), 2 and 3 with the difference that in this case 0.5 part of an oxpropylation product of polymethacrylic acid with 20 moles of propylene oxide was dissolved in 100 parts of vinyl chloride and this solution was introduced under pressure into the aqueous solution that had been placed in the polymerization vessel. The product obtained had dry-blend properties.

EXAMPLE 5

10 moles of ethylene oxide were additively combined with a partially esterified polyvinyl alcohol containing 30 acetate groups per 100 vinyl alcohol groups. This product was applied in an amount of 0.5 part per 100 parts of monomer, as indicated in Example 1(c). The powder obtained had a porous structure.

EXAMPLE 6

20 moles of propylene oxide were additively combined with polyvinyl amine. 0.8 part of this product was dissolved in 100 parts of vinyl chloride and the operation was continued as described in Example 1(c). There was obtained a powder having a porous grain structure.

EXAMPLE 7

A polyacton carboxylic acid, obtained according to German printed patent application No. 1,053,181, was esterified with a polyglycol of a molecular weight of 2,000, the molar ratio of polycarboxylic acid to polyglycol varying from 1:3 to 3:1. The product thus obtained was worked up as described in Example 1(c). The polymer obtained had a porous structure.

EXAMPLE 8

According to Example 1 of German printed patent application 1,054,714, a polymeric hydroxy carboxylic acid was prepared; then 15 moles of ethylene oxide were additively combined with this product. As described in Example 1(c), this product was applied in the polymerization of vinyl chloride. A product having a porous grain was obtained.

EXAMPLE 9

The process was carried out as described in Example 3 with the sole difference that, as a monomer, a mixture of 90 parts of vinyl chloride and 10 parts of vinyl acetate was applied. A powder was obtained that could readily be plasticized.

EXAMPLE 10

1 mole of diglycerol monostearate was hydroxyethylated with 50 moles of ethylene oxide and 1 part thereof was dissolved in a mixture of monomers composed of 95 parts of vinyl chloride and 5 parts of maleic acid diethyl hexyl ester. This solution, together with 0.2 part of lauroyl peroxide, was charged to a solution containing 0.5 part of polyvinyl alcohol in 220 parts of water that had been placed in the polymerization vessel. The batch was polymerized at 50° C. The product obtained had a remarkably good gel tendency.

EXAMPLE 11

1 mole of pentaerythritol monooleate was hydroxyethylated with 25 moles of ethylene oxide. 0.8 part of the product obtained was dissolved in a mixture of monomers composed of 98 parts of vinyl chloride and 2 parts of vinyl laurate. This solution, together with 0.2 part of benzoyl peroxide, was charged to a solution of 0.12 part of methyl cellulose in 220 parts of water and polymerized at 53° C. A polymer which had a porous structure and could very well be worked up was obtained.

EXAMPLE 12

30 moles of ethylene oxide were additively combined with 1 mole of trimethylol propanemonolaurate and 0.2 part of this product, together with 0.6 part of a partially esterified polyvinyl alcohol (20 laurate groups per 100 vinyl alcohol groups) hydroxyethylated with 20 moles of ethylene oxide, was dissolved in 100 parts of vinyl chloride. The polymerization was continued as indicated under 1(c). A polymer was obtained having a porous structure.

EXAMPLE 13

A semi-ester was prepared from maleic anhydride and diglycerol monolaurate and copolymerized with vinyl acetate in the molar ratio of 1:1. The product thus obtained was then esterified with polyglycol having a molecular weight of 400. The ester thus obtained was used for the polymerization according to Example 2.

I claim:

1. In the process for the manufacture of polymers with a porous grain structure from an aqueous suspension of polymerizable starting material consisting of at least 20% of vinyl chloride and 80 to 0% of at least one further vinyl monomer copolymerizable with said vinyl chloride and selected from the group consisting of vinyl ester, vinylidene chloride, maleic acid esters, and esters of acrylic acid and methacrylic acid, in the presence of a suspension agent and a peroxide catalyst, by heating and agitating said suspension to a moderate temperature and subsequently isolating the solid polymerization product formed, the preliminary steps which comprise first admixing with the monomeric starting material 0.02 to 3% by weight of the monomeric starting material of a nonelectrolyte surfactant selected from the group consisting of oxyalkylation products of organic compounds containing carboxyl groups, hydroxyl groups, and amino groups, said surfactant being readily soluble in vinyl halide and which, when dissolved in water in an amount of 0.05% by weight and at a temperature of 25° C. creates a surface tension of not more than 60 to 68 dynes/cm., and then suspending the mixture of monomeric starting material and surfactant in an aqueous medium in the presence of a suspension agent selected from the group consisting of methyl cellulose, gelatine, polyvinyl alcohol and partially esterified polyvinyl alcohol.

2. The process of claim 1 wherein 0.02–0.8% of said surfactant, calculated on the monomeric starting material, is admixed with said monomeric starting material.

3. The process according to claim 1 wherein said surfactant is applied in a quantity of 0.2 to 0.8% by weight calculated on the monomeric starting material.

4. The process according to claim 1 wherein the surfactant is an oxalkylation product of a polyhydric aliphatic alcohol of 2 to 10 carbon atoms, part of the hydroxyl groups of which is esterified with fatty acids of 12 to 20 carbon atoms.

5. The process according to claim 1 wherein the surfactant is an oxalkylation product of a copolymer of (1) at least one monomer selected from the group consisting of unsaturated carboxylic acids and esters thereof, and (2) at least one vinyl monomer.

6. The process according to claim 1 wherein the surfactant is a copolymer of a maleic acid semi-ester and styrene that is oxalkylated with ethylene oxide.

7. The process according to claim 1 wherein the surfactant is a reaction product of (1) a copolymer of a maleic acid semi-ester and an acrylic acid ester, and (2) a polyethylene glycol having a molecular weight of 200.

8. The process according to claim 1 wherein the surfactant is a condensation product of (1) a copolymer of acrylic acid and vinyl acetate and (2) a polyethylene glycol having a molecular weight in the range between 200 and about 10,000.

9. In the process for the manufacture of polyvinyl chloride with a porous grain structure from an aqueous suspension of monomeric vinyl chloride in the presence of a suspension agent and a peroxide catalyst by heating and agitating said suspension to a moderate temperature and subsequently isolating the solid polymerization product formed, the preliminary steps which comprise first admixing with the monomeric starting material 0.02–3% by weight of said monomeric starting material of a non-electrolyte surfactant selected from the group consisting of oxyalkylation products of organic compounds containing carboxyl groups, hydroxyl groups, and amino groups, said surfactant being readily soluble in vinyl halide and which, when dissolved in water in an amount of 0.05% by weight and at a temperature of 25° C. creates a surface tension of not more than 60 to 68 dynes/cm., and then suspending the mixture of monomeric starting material and surfactant in an aqeuous medium in the presence of a suspension agent selected from the group consisting of methyl, cellulose, gelatine, polyvinyl alcohol and partially esterified polyvinyl alcohol.

References Cited in the file of this patent

UNITED STATES PATENTS

| 2,388,601 | Collins | Nov. 6, 1945 |
|---|---|---|
| 2,528,469 | Condo et al. | Oct. 31, 1950 |
| 2,607,761 | Seymour | Aug. 19, 1952 |
| 2,772,256 | Manganelli | Nov. 27, 1956 |
| 2,772,258 | Manganelli | Nov. 27, 1956 |
| 2,890,199 | McNulty et al. | June 9, 1959 |
| 2,895,947 | Shokal et al. | July 21, 1959 |

FOREIGN PATENTS

| 510,492 | Canada | Mar. 1, 1955 |